(12) United States Patent
Lou et al.

(10) Patent No.: US 7,688,898 B1
(45) Date of Patent: Mar. 30, 2010

(54) ADAPTIVE CHANNEL BANDWIDTH SELECTION FOR MIMO WIRELESS SYSTEMS

(75) Inventors: Hui-Ling Lou, Palo Alto, CA (US); Kok-Wui Cheong, San Jose, CA (US); Randy Tsang, Foster City, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/480,179

(22) Filed: Jun. 8, 2009

Related U.S. Application Data

(63) Continuation of application No. 10/743,941, filed on Dec. 23, 2003, now Pat. No. 7,545,867.

(60) Provisional application No. 60/470,743, filed on May 14, 2003.

(51) Int. Cl.
*H04L 27/00* (2006.01)
(52) U.S. Cl. .................................................. 375/259
(58) Field of Classification Search ................ 375/259, 375/267, 316, 346, 343, 345
See application file for complete search history.

(56) References Cited

U.S. PATENT DOCUMENTS

| 6,493,399 | B1 | 12/2002 | Xia et al. |
| 6,519,259 | B1 * | 2/2003 | Baker et al. ............. 370/395.4 |
| 6,870,515 | B2 | 3/2005 | Kitchener et al. |
| 6,912,195 | B2 | 6/2005 | Vook et al. |
| 6,922,445 | B1 | 7/2005 | Sampath et al. |
| 7,020,073 | B2 | 3/2006 | Kadous et al. |
| 7,054,378 | B2 | 5/2006 | Walton et al. |
| 7,120,199 | B2 | 10/2006 | Thielecke et al. |
| 7,164,649 | B2 | 1/2007 | Walton et al. |
| 7,324,523 | B2 | 1/2008 | Dacosta |
| 7,330,701 | B2 | 2/2008 | Mukkavilli et al. |
| 7,461,164 | B2 | 12/2008 | Edwards et al. |

FOREIGN PATENT DOCUMENTS

EP 1309102 A1 5/2003

OTHER PUBLICATIONS

Flexible Transmission Bandwidth Management with Effective Channel Reservation Techniques for NGSO MSS Networks; Konishi et al, Sep. 1997, IEEE Journal on Selected Areas in Communications, vol. 15, No. 7, pp. 1197-1207.*

Catreux/Erceg/Gesbert/Heath, "Adaptive Modulation and MIMO Coding for Broadband Wireless Data Networks", IEEE Communications Magazine, Jun. 2002, pp. 108-115.

Chizhik/Foschini/Gans/Valenzuela, "Keyholes, Correlations, and Capacities of Multielement Transmit and Receive Antennas", IEEE Transactions on Wireless Communications, vol. 1, No. 2, Apr. 2002, pp. 361-368.

(Continued)

*Primary Examiner*—Kevin M Burd

(57) ABSTRACT

A wireless communications device for a multiple input multiple output (MIMO) wireless communications system. The wireless communication device includes a radio frequency (RF) transceiver including at least two antennae. A medium access control (MAC) device to dynamically adjust a bandwidth of the wireless communications device by adjusting a number of channels associated with at least two antennae. The adjusting of the number of channels associated with at least two antennae is based at least on a transmission error rate or a correlation measurement.

18 Claims, 11 Drawing Sheets

OTHER PUBLICATIONS

Driessen/Foschini, "Transactions Letters On the Capacity Formula for Multiple Input-Multiple Output Wireless Channels: A Geometric Interpretation", IEEE Transactions on Communications, vol. 47, No. 2, Feb. 1999, pp. 173-176.

Foschini/Gans, "On Limits of Wireless Communications in a Fading Environment when Using Multiple Antennas", Wireless Personal Communications 6: pp. 311-335, 1998.

Goldsmith/Chua, "Variable-Rate Variable-Power MQAM for Fading Channels", IEEE Transactions on Communications, vol. 45, No. 10, Oct. 1997, pp. 1218-1230.

Goldsmith/Jafar/Jindal/Vishwanath, "Fundamental Capacity of MIMO Channels", Department of Electrical Engineering, Stanford University, Nov. 8, 2002, pp. 1-36.

http://www.chipcenter.com/wireless/images/app007_Fig1.jpg, Figure 1: MIMO applied to OFDM (JPEG image 350×230 pixels).

http://www.chipcenter.com/wireless/images/app007_Fig3.jpg, Figure 3: The MIMO Principle (JPEG image 350×190 pixels).

Mujtaba/Grewe, http://chipcenter.com/wireless/app007-2html?PRINT=true, Wireless Application Note, "Taking Wireless Networking to the Next Performance Plateau", pp. 1-3.

Mujtaba/Grewe, http://chipcenter.com/wireless/app007-2html?PRINT=true, Wireless Application Note, "Taking Wireless Networking to the Next Performance Plateau . . . (Continued)", pp. 1-2.

Seong/Kim, "Adaptive Modulation for MIMO Systems in Time-Varying Channels", EE359 Wireless Communications Fall 2002 Term Project, pp. 1-21.

Winters, "On the Capacity of Radio Communication Systems with Diversity in a Rayleigh Fading Environment", IEEE Journal on Selected Areas in Communications, vol. SAC-5, No. 5, Jun. 1987, pp. 871-878.

Winters, "Optimum Combining in Digital Mobile Radio with Cochannel Interference", IEEE Journal on Selected Areas in Communications, vol. SAC-2, No. 4, Jul. 1984, pp. 528-539.

Winters, "Smart Antennas for Wireless Systems", IEEE Personal Communications, Feb. 1998, pp. 23-27.

Wolniansky/Foschini/Golden/Valenzuela, "V-BLAST: An Architecture for Realizing Very High Data Rates Over the Rich-Scattering Wireless Channel", 1998 IEEE, pp. 295-300.

ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.

IEEE P802.11g/D8.2 Apr. 2003 (Supplement to ANSI/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std, 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11b-1999/Cor 1-2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

802.16 IEEE Standard for Local and Metropolitan Area Networks; Part 16: Air Interface for Fixed Broadband Wireless Access Systems; 802.16 IEEE Standard for Local and Metropolitan Area Networks; Oct. 1, 2004; pp. i-xxxiv and pp. 1-857, IEEE Std 802.16-2004, IEEE, United States.

Merriam-Webster OnLine definition of "bandwidth".

Flexible Transmission Bandwidth Management with Effective Channel Reservation Techniques for NGSO MSS Networks; Konishi et al.; Sep. 1997; IEEE Journal on Selected Areas in Communications, vol. 15, No. 7; pp. 1197-1207.I.

* cited by examiner

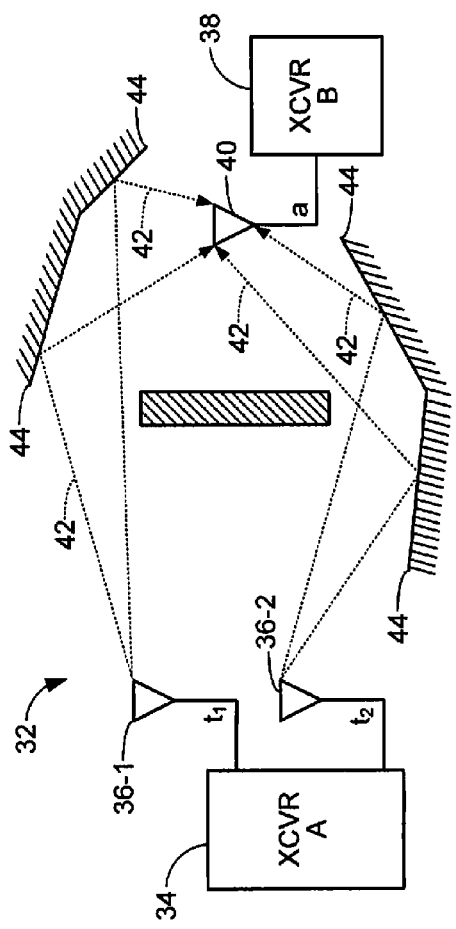
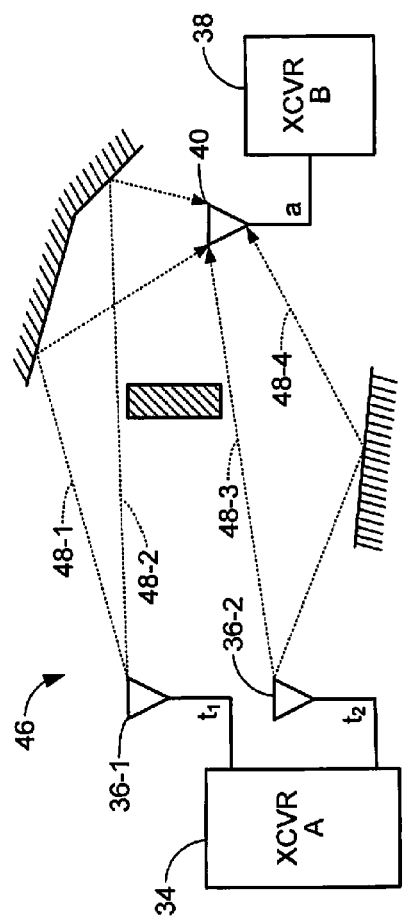
FIG. 2
Prior Art
FIG. 3
Prior Art

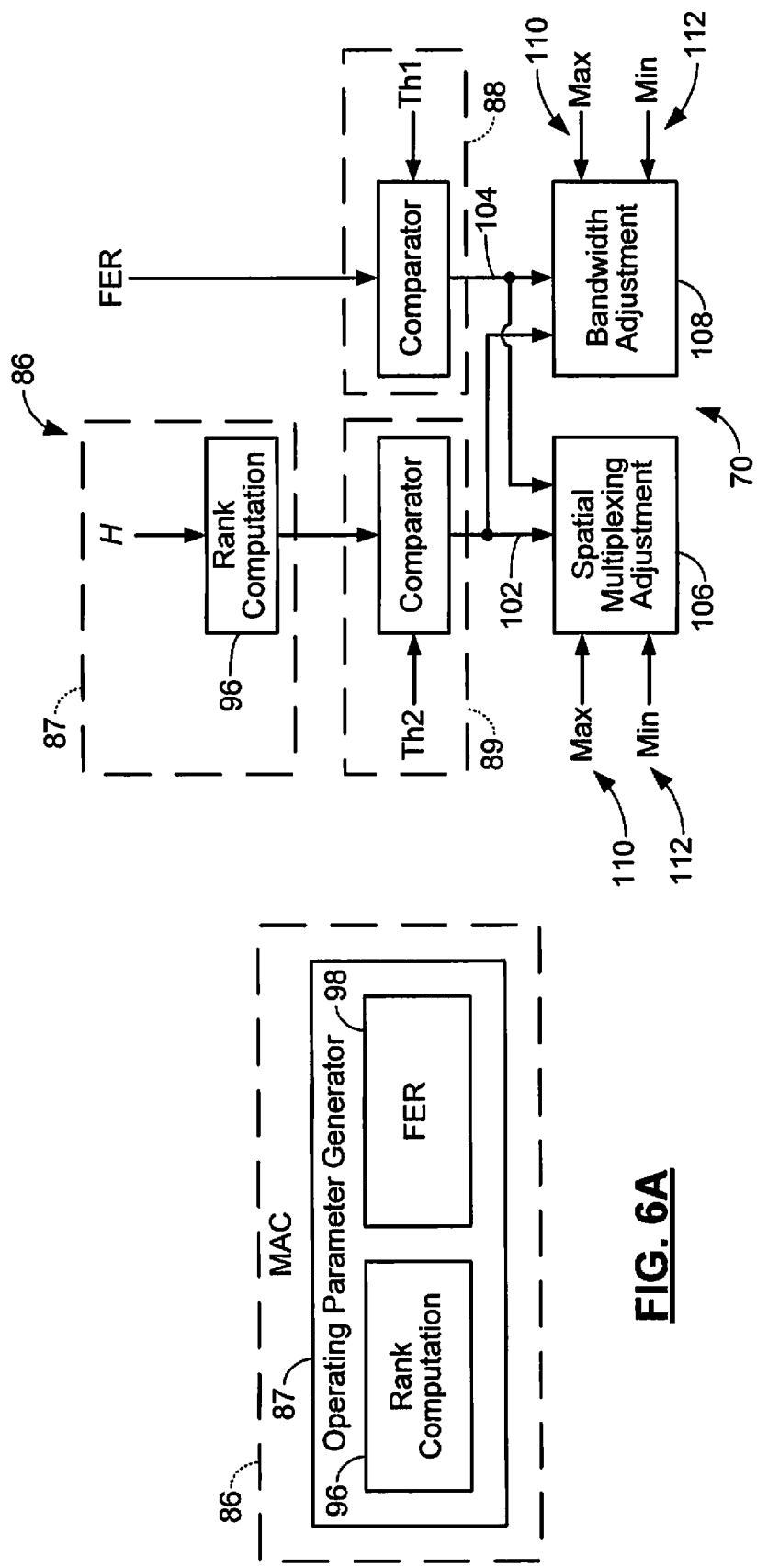

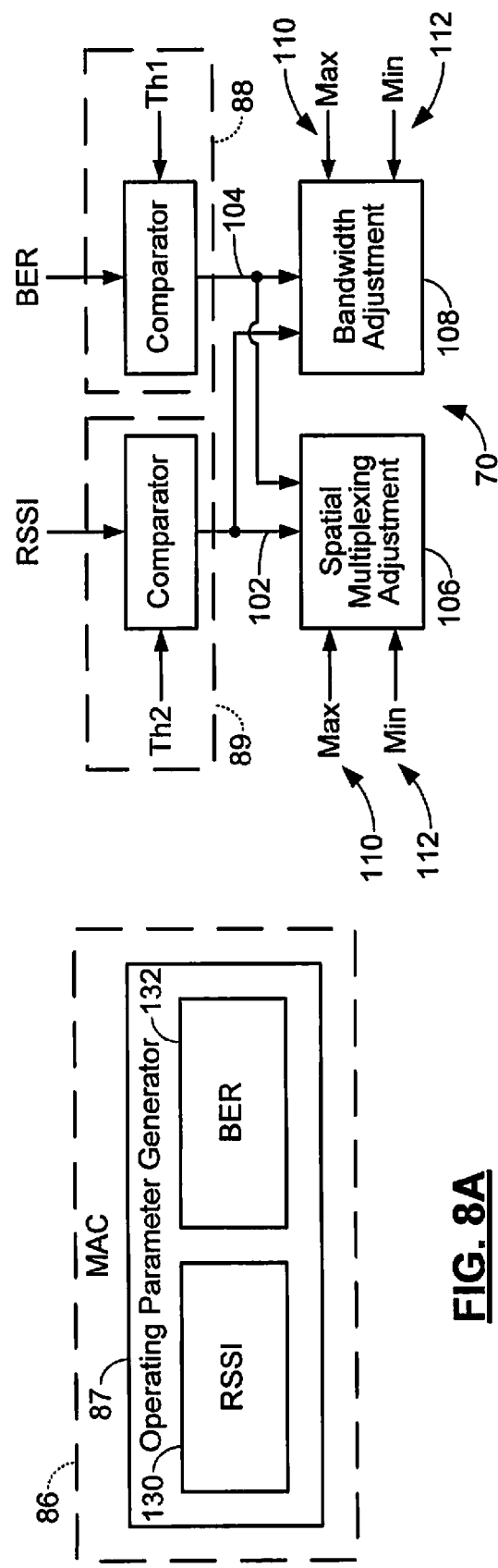

ered and may be separated by the wireless communications device 12. This is conceptually equivalent to transmitting data across M independent channels.

ADAPTIVE CHANNEL BANDWIDTH SELECTION FOR MIMO WIRELESS SYSTEMS

CROSS-REFERENCE TO RELATED APPLICATIONS

This application is a continuation of U.S. patent application Ser. No. 10/743,941, filed Dec. 23, 2003, which claims the benefit of U.S. Provisional Application No. 60/470,743, filed May 14, 2003, which are hereby incorporated by reference in their entirety.

FIELD OF THE INVENTION

The present invention relates to wireless communications systems, and more particularly to a link adaptation module for multiple input multiple output (MIMO) wireless communications systems.

BACKGROUND OF THE INVENTION

Multiple input multiple output (MIMO) wireless communications systems include multiple antennae. Spectrally efficient techniques are employed to increase data rates over wireless channels, which typically have limited bandwidth and transmit power. Space-time processing techniques are commonly used to increase spectral efficiency and data throughput per channel bandwidth, which is commonly measured in bits per second per Hertz. For example, techniques such as adaptive array processing, spatial multiplexing, and space-time coding are employed to increase spectral efficiency and the reliability of data that is wirelessly transmitted in a fading environment.

There is interest in applying space-time processing techniques such as spatial multiplexing and space-time block coding to next generation wireless local area networks (WLANs). For example, the IEEE 802.11 high-throughput study group (HTSG) has proposed systems that have throughputs in excess of 100 Mbps. This requires a data rate that is greater than 150 Mbps to account for overhead from medium access control (MAC) device headers.

Referring to FIG. 1, a MIMO wireless communications system 10 includes a wireless communications device 11 and a wireless communications device 12. The wireless communications device 11 includes a radio frequency (RF) transceiver 13 with M antennae 14. The wireless communications device 12 includes a RF transceiver 15 with N antennae 18. The wireless communications device 11 also includes a space-time processor 20. An input of the space-time processor 20 receives a symbol sequence $b=\{b_0, b_1, b_2, \ldots, b_{k-1}\}$ with k symbols. The space-time processor 20 formats the symbols for transmission and feeds the symbols to the RF transceiver 13. Symbols are transmitted by the M antennae 14 during one or more symbol periods.

In one configuration, the space-time processor 20 implements spatial multiplexing. Spatial multiplexing ideally produces an M-fold increase in system capacity (in bits per second per Hertz), where the RF transceiver 13 includes the M antennae 14 and the RF transceiver 15 includes the N antennae 18, and where N is greater than or equal to M. For example, with first and second antennae at RF transceiver 13, the first antenna transmits symbol $c_1$ and the second antenna transmits symbol $c_2$ during a first symbol period. During a second symbol period, the first antenna transmits symbol $c_3$ and the second antenna transmits symbol $c_4$. This approach requires that the system operates in a rich-scattering environment and that transfer functions between pairs of antennae at the wireless communications devices 11 and 12, respectively, are uncorrelated and may be separated by the wireless communications device 12. This is conceptually equivalent to transmitting data across M independent channels.

In another configuration, the space-time processor 20 implements space-time block coding. A space-time block code generates blocks that include one or more symbols. For example, the space-time processor 20 may implement a rate–1 orthogonal space-time code that encodes two symbols per block. With first and second antennae at RF transceiver 13, two symbols are transmitted during two consecutive symbol periods. For example, during a first symbol period, the first antenna transmits $c_1$ and the second antenna transmits $c_2$. During a second symbol period, the first antenna transmits $-c^*_2$ and the second antenna transmits $c^*_1$ where $c^*_1$ and $c^*_2$ are the complex conjugates of $c_1$ and $c_2$, respectively. The space-time processor 20 transmits complex conjugates of the symbols to add redundancy and to allow a wireless communications device to reconstruct a signal in the event that a transmission path experiences noise and fading.

The N antennae 18 of the RF transceiver 15 receive signal transmissions through $h_{ij}$, illustrated at 22, where $h_{ij}$ is the channel estimation of the channel between antenna i of RF transceiver 13 and antenna j of RF transceiver 15 during a symbol period. The wireless communications device 12 includes a space-time combination module 24. The RF transceiver 15 sends received symbols to an input of the space-time combination module 24.

The space-time combination module 24 outputs decoded data sequence $\hat{b}=\{\hat{b}_0, \hat{b}_1, \hat{b}_2, \ldots, \hat{b}_{k-1}\}$ based on the received symbols. The space-time combination module 24 employs combining techniques such as zero-forcing or minimum mean square error (MMSE) techniques. With MMSE, received symbols are linearly combined using a set of weights that yields a minimum mean square error between the estimated sequence and the true sequence. Non-linear techniques such as V-BLAST may also be employed.

V-BLAST utilizes a recursive procedure that sequentially detects different signal components from antennae of the RF transceiver 15 in an optimal order. Spatial multiplexing is preferred over space-time block coding due to the M-fold increase in throughput with the addition of M antennae at the wireless communications device 11. However, successful utilization of spatial multiplexing requires a wireless communications system that operates in a rich-scattering environment.

Referring now to FIG. 2, a first wireless communications system 32 operates in a rich-scattering environment. The first wireless communications system 32 includes a transceiver 34 with first and second antennae 36-1 and 36-2, respectively, and a remote transceiver 38 with an antenna 40. In a rich-scattering environment independent transmission paths 42 exist between pairs of antennae at the transceivers 34 and 38, and many reflections, illustrated at 44, occur. The transmission paths 42 are uncorrelated at the remote transceiver 38, and line of sight (LOS) does not exist between pairs of antennae at the transceivers 34 and 38.

Referring now to FIG. 3, in a second wireless communications system 46, LOS exists between the second antenna 36-2 at the transceiver 34 and the antenna 40 at the remote transceiver 38. The transmission paths 48-1, 48-2, 48-3, and 48-4 may be correlated at the remote transceiver 38 and/or the received signal at the remote transceiver 38 may be dominated by transmission path 48-3. This can complicate the separation of independent transmissions. Insufficient scattering and/or spacing between pairs of antennae at the transceivers 34 and 38 can cause fading to be correlated. Additionally, in a "keyhole" effect environment, fading is correlated when multiple transmissions merge and then diverge, which complicates signal separation at the remote transceiver 38. Space-time processing techniques are largely ineffective in LOS and "keyhole" effect environments as well as other situations that cause fading correlation.

Significant increases in transmit power are required to maintain a desired throughput while such environments exist. However, many wireless communications systems at given bandwidths are power-limited by regulatory bodies. Polarization and/or array geometries of antennae at the local and remote transceivers 34 and 38, respectively, may also be exploited by spreading out antenna elements or by adding reflectors that create scattering. However, both options are very expensive and may be prohibitive for consumer applications such as WLAN for home use.

SUMMARY OF THE INVENTION

A wireless communications device for a multiple input multiple output (MIMO) wireless communications system. The wireless communication device includes a radio frequency (RF) transceiver including at least two antennae. A medium access control (MAC) device to dynamically adjust a bandwidth of the wireless communications device by adjusting a number of channels associated with at least two antennae. The adjusting of the number of channels associated with at least two antennae is based at least on a transmission error rate or a correlation measurement.

BRIEF DESCRIPTION OF THE DRAWINGS

The present invention will become more fully understood from the detailed description and the accompanying drawings, wherein:

FIG. 2 illustrates a wireless communications system in a rich-scattering environment according to the prior art;

FIG. 3 illustrates a wireless communications system in a line of sight (LOS) environment where fading is correlated at a remote transceiver according to the prior art;

FIG. 6A illustrates a first exemplary operating parameter generator in a wireless communications device that includes a rank computation module and a frame error rate (FER) generator;

FIG. 6B is a functional block diagram of a first exemplary link adaptation system that is based on a channel matrix and an FER;

FIG. 8A illustrates a third exemplary operating parameter generator in a wireless communications device that includes a received signal strength indicator (RSSI) generator and a bit error rate (BER) generator;

FIG. 8B is a functional block diagram of a third exemplary link adaptation system that is based on an RSSI and a BER;

DETAILED DESCRIPTION OF THE PREFERRED EMBODIMENTS

Figure 1:
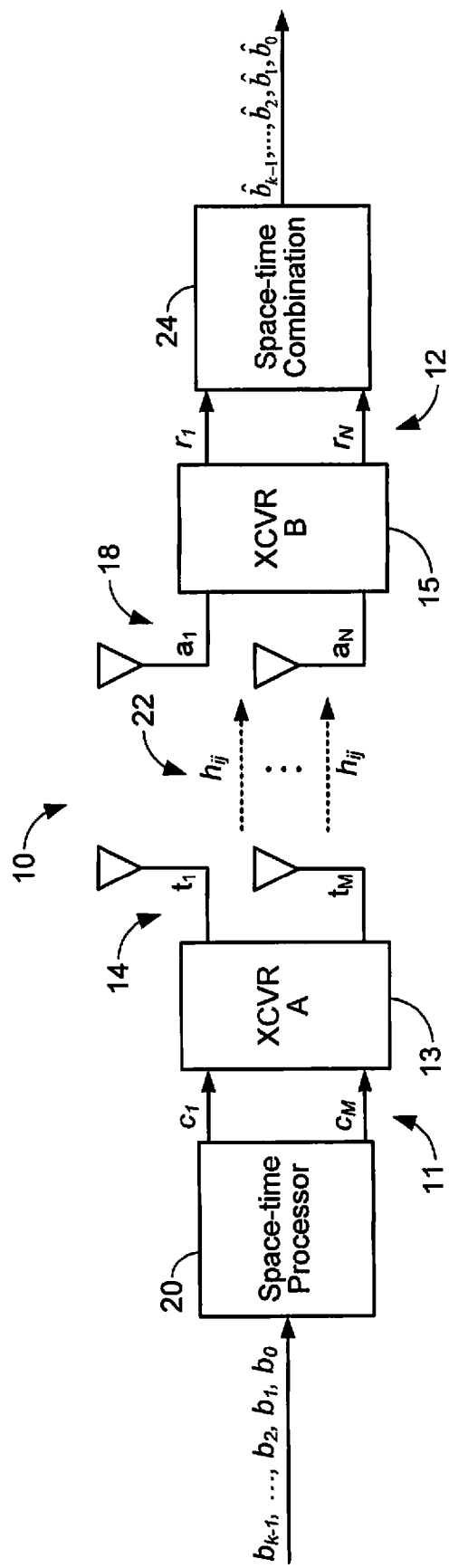
FIG. 1 is a functional block diagram of a multiple in multiple out (MIMO) wireless communications system that implements space-time processing according to the prior art.

The following description of the preferred embodiments) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

An achievable throughput for a wireless channel is heavily dependent on the statistical properties of the channel and the correlation between signals. A complex baseband vector of a single-user MIMO link is expressed as y=H·x+n, where y is an N×1 receive vector, x is an M×1 transmit vector, n is an N×1 additive white circularly symmetric complex Gaussian noise vector, and H is an N×M channel matrix. The channel matrix $$H = \begin{bmatrix} h_{11} & h_{12} & \ldots & h_{1M} \\ h_{21} & h_{22} & \ldots & h_{2M} \\ \vdots & \vdots & \vdots & \vdots \\ h_{N1} & h_{N2} & \ldots & h_{NM} \end{bmatrix},$$

where $h_{ij}$ is the complex gain of a channel between the $j^{th}$ antenna of a transmitting wireless communications device and the $i^{th}$ antenna at a receiving wireless communications device. The complex gain may be expressed as $h_{ij}=\alpha j\beta=|h_{ij}|\cdot e^{j\Theta_{ij}}$. Complex gain terms of $|h_{ij}|$ are typically Rayleigh distributed in a rich-scattering environment where LOS does not exist between pairs of antennae at local and wireless communications devices.

When a channel is known at a wireless communications device, the capacity C in bits per second per Hertz may be expressed as $$C = \log_2\left(\det\left[I_N + \left(\frac{\rho}{M}\right)HH^*\right]\right),$$

where H* is the complex conjugate transpose of H and $I_N$ is the N×N identity matrix. In the term $$\rho = \frac{E_s}{N_o},$$

$E_s$ is the average total transmit power and ρ is the average total receive signal-to-noise ratio (SNR). Also, $$\frac{E_s}{M}$$

expresses the transmit power per antenna. If r is the rank of the matrix that represents the channel and $\lambda_i$, where i=1, 2, 3, . . . , r, expresses the positive eigenvalues of HH*, the capacity $$C = \sum_{i=1}^{r} \log_2\left(1 + \frac{\rho}{M}\lambda_i\right).$$

Therefore, capacity scales linearly with rank r, which has a maximum value that is equal to the minimum of M and N. This is relative to a single input single output (SISO) wireless channel that includes one antenna at both the local and wireless communications devices. However, this assumes that the channel operates in a rich-scattering environment as illustrated in FIG. 2. Additionally, it assumes that the channel matrix H has full rank and independent entries and that perfect channel estimates of the gains are available at the wireless communications device. If, for any reason, the rank reduces, the capacity reduces.

In a line of sight (LOS) environment, insufficient scattering and/or spacing between antennas exists, which causes fading to be correlated. In such an environment, the rank of H may reduce to 1 and the expression for capacity becomes $C=\log_2(1+N\rho)$. This is similar to a situation where only receive diversity exists. Therefore, capacity scales logarithmically with N as opposed to linearly. To achieve a comparable capacity, the SNR must be significantly increased in an LOS environment. This is commonly done by increasing the transmit power. However, as discussed above, transmit power in wireless channels is restricted by regulatory bodies.

Even if a high SNR is achieved in a power-limited system where fading is correlated, it is unlikely that the system can support an M-fold increase in capacity with the addition of M antennae at a wireless communications device. Additionally, even when minimal fading correlation exists, the rank of a channel matrix for a wireless communications system that operates in a "keyhole" effect environment may reduce to 1. Therefore, an increase in the channel bandwidth may be required to maintain a desired throughput in a MIMO wireless communications system. Since space-time processing techniques are largely ineffective in wireless channels where fading is correlated, measurements of the condition of a wireless channel may be used to adaptively select a channel bandwidth that is sufficient to maintain a desired throughput. Additionally, an amount of spatial multiplexing may be adjusted or a space-time processor may disable spatial multiplexing based on the condition measurements. In the event that spatial multiplexing is disabled, SISO techniques may be employed to achieve as high a throughput as possible. For example, the constellation size, transmit power, and/or coding may be adjusted to increase throughput when spatial multiplexing is disabled.

Figure 4A:
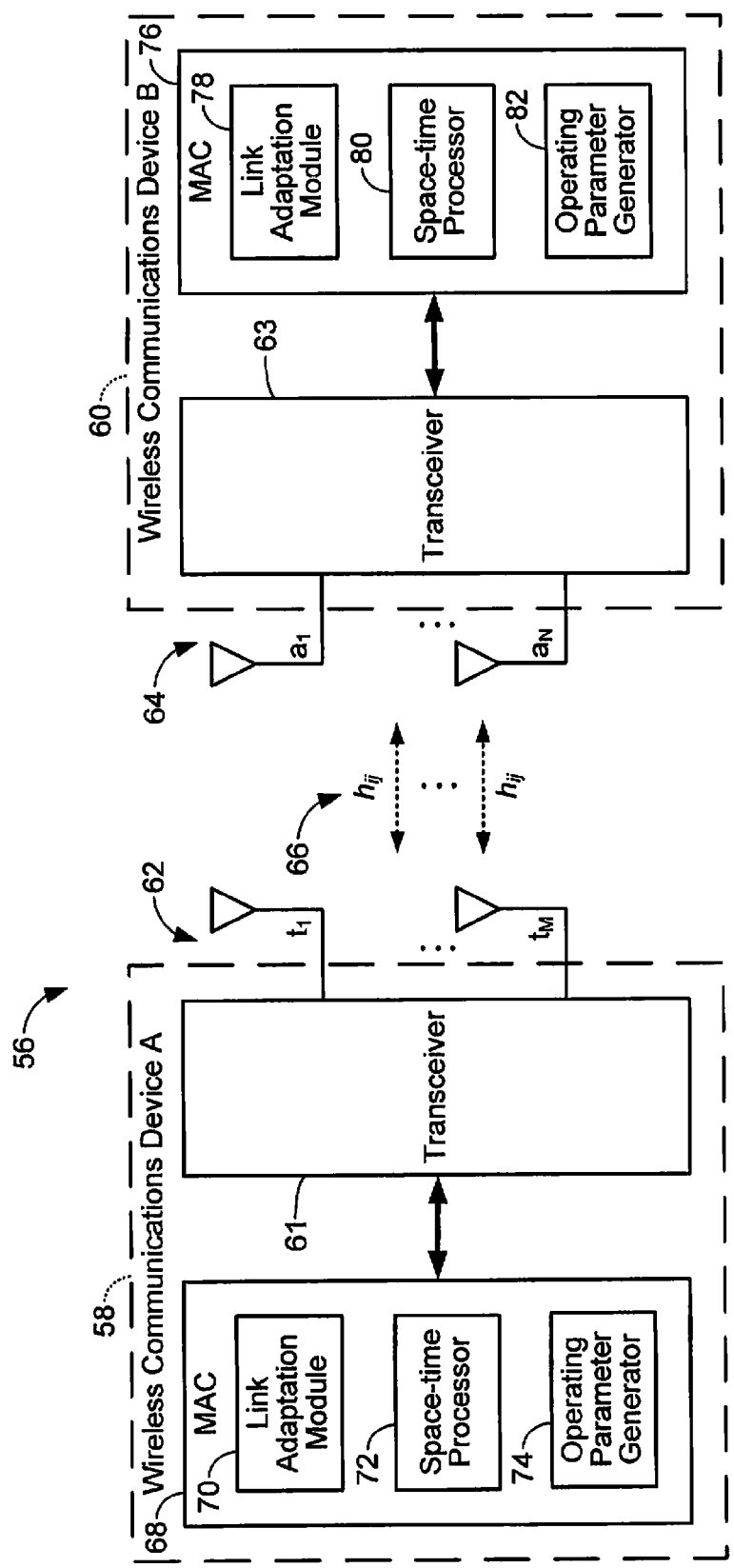
FIG. 4A illustrates a first exemplary MIMO wireless communications system according to the present invention.

Referring now to FIG. 4A, a MIMO wireless communications system 56 includes a wireless communications device 58 and a remote wireless communications device 60. The wireless communications device 58 includes a RF transceiver 61 with M antennae 62 and the remote wireless communications device 60 includes a RF transceiver 63 with N antennae 64. In an exemplary embodiment, the RF transceiver 61 includes at least two antennae and the remote RF transceiver 63 includes at least two antennae. Additionally, a first number of antennae at the remote RF transceiver 63 is preferably at least as great as a second number of antennae at the RF transceiver 61.

The RF transceivers 61 and 63 transmit/receive signal transmissions through $h_{ij}$, illustrated at 66. The wireless communications device 5B includes a medium access control (MAC) device 68 that controls access to the wireless medium. The MAC device 68 includes a link adaptation module 70, a space-time processor 72, and an operating parameter generator 74. The remote wireless communications device 60 likewise includes a MAC device 76 that includes a link adaptation module 78, a space-time processor 80, and an operating parameter generator 82.

Link adaptation module 70 adjusts transmit parameters of the wireless communications device 58 including the bandwidth based on operating parameters that are generated by the operating parameter generator 82 of the remote wireless communications device 60. Link adaptation module 70 also adjusts the operation of the space-time processor 72 based on these operating parameters. For example, the link adaptation module 70 may instruct the space-time processor 72 to increase, decrease, or cease spatial multiplexing. Operating parameter generator 74 generates operating parameters that indicate the condition of the channel for other communications devices based on signals received from the remote wireless communications device 60. The operating parameters may include signal correlation properties and transmission error rates.

Figure 4B:
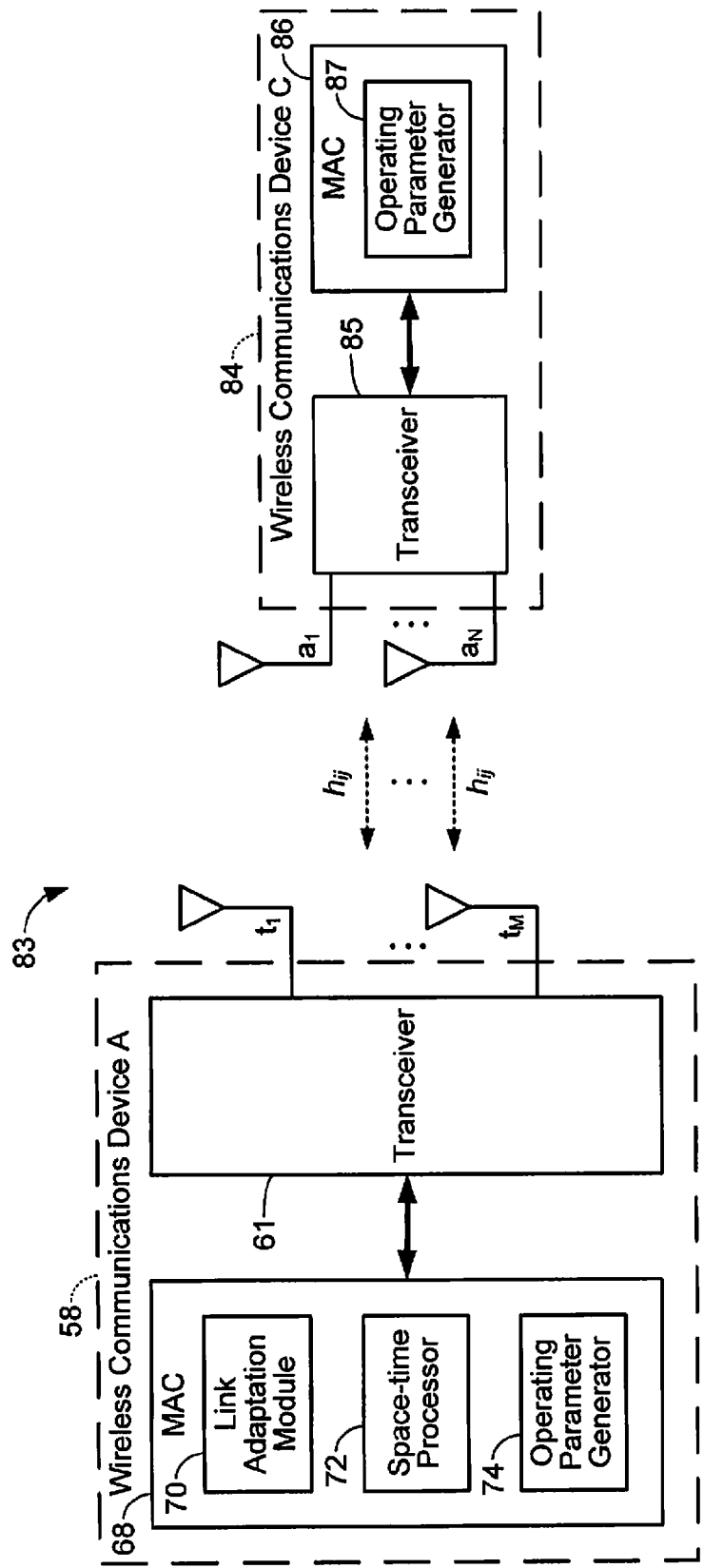
FIG. 4B illustrates a second exemplary MIMO wireless communications system.

Referring now to FIG. 4B, an exemplary MIMO wireless communications system 83 includes wireless communications device 58 and a remote wireless communications device 84. The remote wireless communications device 84 includes a remote RF transceiver 85 and a MAC device 86. The MAC device 86 includes an operating parameter generator 87. The operating parameter generator 87 sends operating parameters that indicate a condition of the wireless channel to wireless communications device 58. The operating parameters are based on signals that are received by the remote wireless communications device 84 and that are from wireless communications device 58. The link adaptation module 70 receives the operating parameters and adjusts the bandwidth and/or the space-time processing configuration of the wireless communications device 58 based on the operating parameters.

Figure 5:
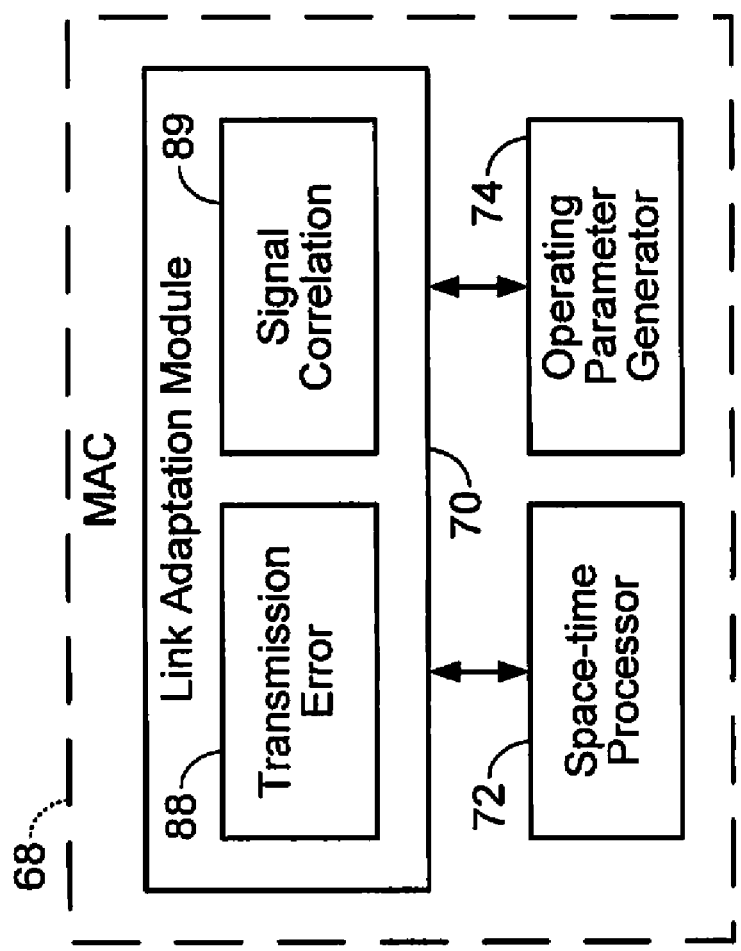
FIG. 5 is a functional block diagram of a medium access control (MAC) device according to the present invention.

Referring now to FIG. 5, the MAC device 68 of the wireless communications device 58 is illustrated in further detail. The link adaptation module 70 communicates with the space-time processor 72 and the operating parameter generator 74. The link adaptation module 70 includes a transmission error module 88 and a signal correlation module 89. The transmission error module 88 receives operating parameters from the operating parameter generator 87 of the remote wireless communications device 84 that indicate the transmission error rate of the channel. For example, the transmission error rate may be a frame error rate (FER), a signal quality (SQ) measurement, or another operating parameter. Based on the transmission error rate, the transmission error module 88 determines whether the wireless communications device 58 is maintaining a desired throughput. When the transmission error module 88 determines that the wireless communications device 58 is not maintaining a desired throughput, the link adaptation module 70 adjusts the bandwidth and/or the space-time processing properties such an amount of spatial multiplexing.

The signal correlation module 89 also receives operating parameters from the operating parameter generator 87. The operating parameters indicate a correlation measurement of signals that are received by the remote wireless communications device 84. For example, the correlation measurement may be a rank of the channel matrix, an angle of array (AOA) of the signal at the remote wireless communications device 84, or another operating parameter. Based on the correlation measurement, the signal correlation module 89 determines whether the MIMO wireless communications system 83 is operating in a rich-scattering environment or another environment such as a line of sight (LOS) environment. The link adaptation module 70 adjusts the bandwidth of the wireless communications device 58 and/or the space-time processing properties of the space-time processor 72 based on the correlation properties of the wireless channel.

When the wireless channel operates in a rich-scattering environment, space-time processing techniques are utilized to improve the throughput and the reliability of transmitted data. When the channel conditions are such that space-time processing techniques can no longer maintain a desired throughput, the link adaptation module 70 increases the bandwidth. For example, an exemplary IEEE 802.11a system in a correlated fading environment achieves 54 Mbps over a 20 MHz channel using a 64QAM constellation. The system requires a constellation size of 4096 in order to double the bit-rate using the same channel bandwidth and the same symbol rate. Therefore, depending on the rank and the receive SNR, two or more 20 MHz channels are required to achieve three times the bit-rate of the single 20 MHz channel.

A lower channel bandwidth may be utilized when the channel conditions allow for successful use of space-time processing techniques. This maximizes the chance of finding a clear channel and reduces interference with other systems that share the same frequency band. A higher channel bandwidth is utilized when channel conditions are not favorable for spatial multiplexing. The link adaptation module 70 preferably chooses consecutive channels when increasing bandwidth to minimize the complexity of the front end. However, non-adjacent channels may also be utilized to maximize the chance of finding a clear channel or to obtain frequency diversity.

The link adaptation module 70 adjusts a bandwidth usage of the wireless communications device 58 and/or a system rate based on the transmission error rate and the correlation measurement. The link adaptation module 70 adjusts the system rate by adjusting an amount of spatial multiplexing that is executed by the space-time processor 72. For example, the wireless communications device 58 sets a desired throughput and the link adaptation module 70 adjusts the bandwidth and/or the amount of spatial multiplexing to maintain the desired throughput. The link adaptation module 70 may also initially instruct the space-time processor 72 to implement a maximum amount of spatial multiplexing to operate the system at the highest possible rate. When the correlation measurement is sufficiently low and the transmission error rate is also high, the link adaptation module 70 instructs the space-time processor 72 to decrease the amount of spatial multiplexing. The link adaptation module 70 may also turn disable spatial multiplexing to conserve power while the remote wireless communications device 84 operates as a SISO decoder.

The link adaptation module 70 decreases the bandwidth and increases the amount of spatial multiplexing when the transmission error rate is less than a first predetermined value and the correlation measurement is less than a second predetermined value. A low transmission error rate and correlation measurement are indicative of a rich-scattering wireless channel environment. Therefore, the link adaptation module 70 decreases the bandwidth to conserve resources. Also, the space-time processor 72 takes advantage of the rich-scattering environment by operating the system at as high a rate as possible by utilizing a maximum amount of spatial multiplexing. For example, the transmission error module 88 and the signal correlation module 89 may compare the transmission error rate and the correlation measurement to predetermined thresholds. Based on the relationship between the operating parameters and the predetermined thresholds, the transmission error module 88 and the signal correlation module 89 may generate control signals and send the control signals to the link adaptation module 70.

The link adaptation module 70 increases the bandwidth and decreases the amount of spatial multiplexing when the transmission error rate is greater than the first predetermined value. A high transmission error rate and correlation measurement are indicative of an environment such as a line of sight (LOS) environment, where space-time processing techniques are largely ineffective. Therefore, the link adaptation module 70 increases the bandwidth to attempt to maintain the desired throughput. When the correlation measurement of the signals at the remote wireless communications device 84 is very high, space-time processing techniques may be completely ineffective and the link adaptation module 70 may disable spatial multiplexing to conserve power. In an exemplary embodiment, the link adaptation module of the present invention is otherwise compliant with at least one of IEEE 802.11, 802.11a, 802.11g, 802.11n, and 802.16, which are hereby incorporated by reference in their entirety.

Referring now to FIGS. 6A and 6B, the operating parameter generator 87 of the remote wireless communications device 84 includes a rank computation module 96 and a frame error rate (FER) generator 98. The rank computation module 96 determines the rank of the channel matrix and the FER generator 98 determines an FER between the wireless communications device 58 and the remote wireless communications device 84. The rank of a matrix is equal to the number of linearly independent rows or columns in the matrix. For example, the rank of the channel matrix H may be computed using Gaussian elimination methods. For example, a high rank may indicate a rich-scattering environment and a low rank may indicate an LOS environment. The remote wireless communications device 84 sends the rank and the FER to the link adaptation module 70 of the wireless communications device 58.

Referring to the link adaptation module 70 of FIG. 6B, the signal correlation module 89 compares the rank to a first threshold and generates a signal correlation control signal 102 based on the comparison. Similarly, the transmission error module 88 compares the FER to a second threshold and generates a transmission error control signal 104 based on the comparison. A spatial multiplexing adjustment module 106 and a bandwidth adjustment module 108 receive the transmission error control signal 104 and the signal correlation control signal 102. The bandwidth adjustment module 108 adjusts the bandwidth of the wireless communications device 58 and the spatial multiplexing adjustment module 106 adjusts the amount of spatial multiplexing based on the control signals 102 and 104. Additionally, both the spatial multiplexing adjustment module 106 and the bandwidth adjustment module 108 includes maximum and minimum thresholds 110 and 112, respectively, that define the ranges in which the properties may be adjusted.

Figures 7A, 7B:
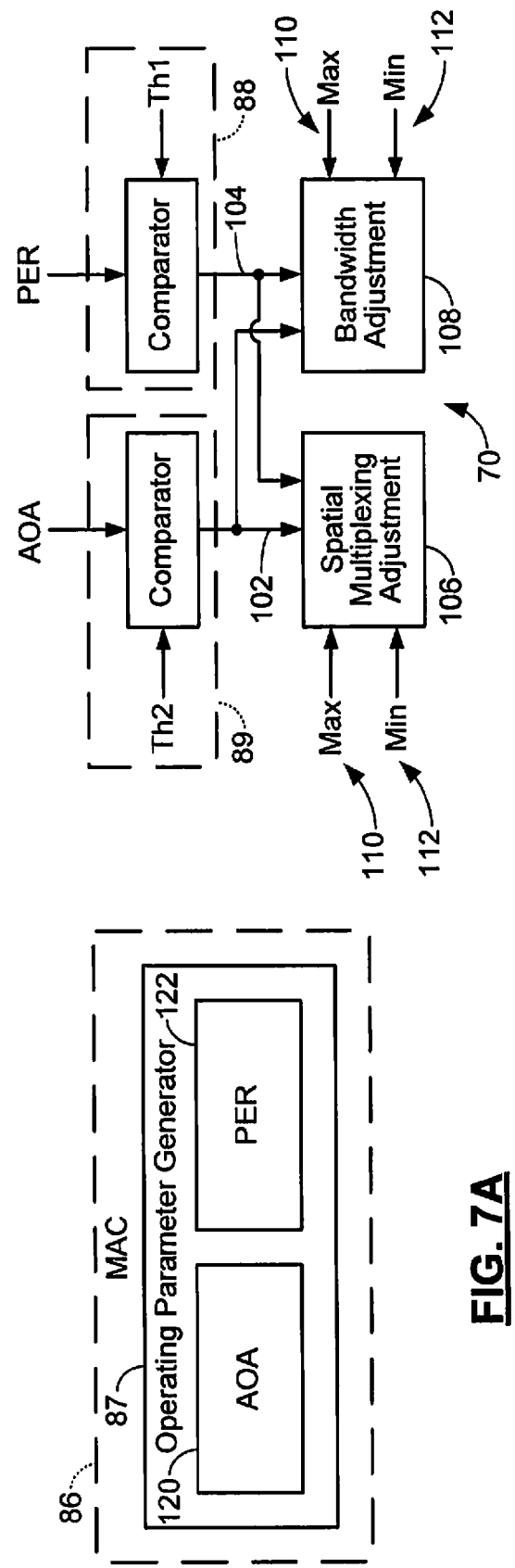
FIG. 7A illustrates a second exemplary operating parameter generator in a wireless communications device that includes an angle of array (AOA) generator and a packet error rate (PER) generator.
FIG. 7B is a functional block diagram of a second exemplary link adaptation system that is based on an AOA and PER.

Referring now to FIGS. 7A and 7B, the operating parameter generator 87 of the remote wireless communications device 84 includes an angle of array (AOA) generator 120 and a packet error rate (PER) generator 122. The AOA generator 120 determines an angle of array of the signal at the remote wireless communications device 84, and the PER generator 122 determines a PER between the wireless communications device 58 and the remote wireless communications device 84. For example, a high AOA may indicate a rich-scattering environment and a low AOA may indicate an LOS or "keyhole" effect environment. The remote wireless communications device 84 sends the AOA and the PER to the link adaptation module 70 of the wireless communications device 58.

Referring to the link adaptation module 70 in FIG. 7B, the signal correlation module 89 compares the AOA to a first threshold and generates the signal correlation control signal 102 based on the comparison. Similarly, the transmission error module 88 compares the PER to a second threshold and generates the transmission error control signal 104 based on the comparison. The spatial multiplexing adjustment module 106 and the bandwidth adjustment module 108 receive the transmission error control signal 104 and the signal correlation control signal 102.

Referring now to FIGS. 8A and 8B, the operating parameter generator 87 of the remote wireless communications device 84 includes a received signal strength indicator (RSSI) generator 130 and a bit error rate (BER) generator 132. The RSSI generator 130 determines a strength of the signal at the remote wireless communications device 84, and the BER generator 132 determines a BER between the wireless communications device 58 and the remote wireless communications device 84. For example, a high RSSI and a high BER may indicate an LOS or "keyhole" effect environment when the amount of spatial multiplexing is high. The remote wireless communications device 84 sends the RSSI and the BER to the link adaptation module 70 of the wireless communications device 58.

Referring to the link adaptation module 70 in FIG. 8B, the signal correlation module 89 compares the RSSI to a first threshold and generates the signal correlation control signal 102 based on the comparison. The transmission error module 88 compares the BER to a second threshold and generates the transmission error control signal 104 based on the comparison. The spatial multiplexing adjustment module 106 and the bandwidth adjustment module 108 receive the transmission error control signal 104 and the signal correlation control signal 102.

Figures 9A, 9B:
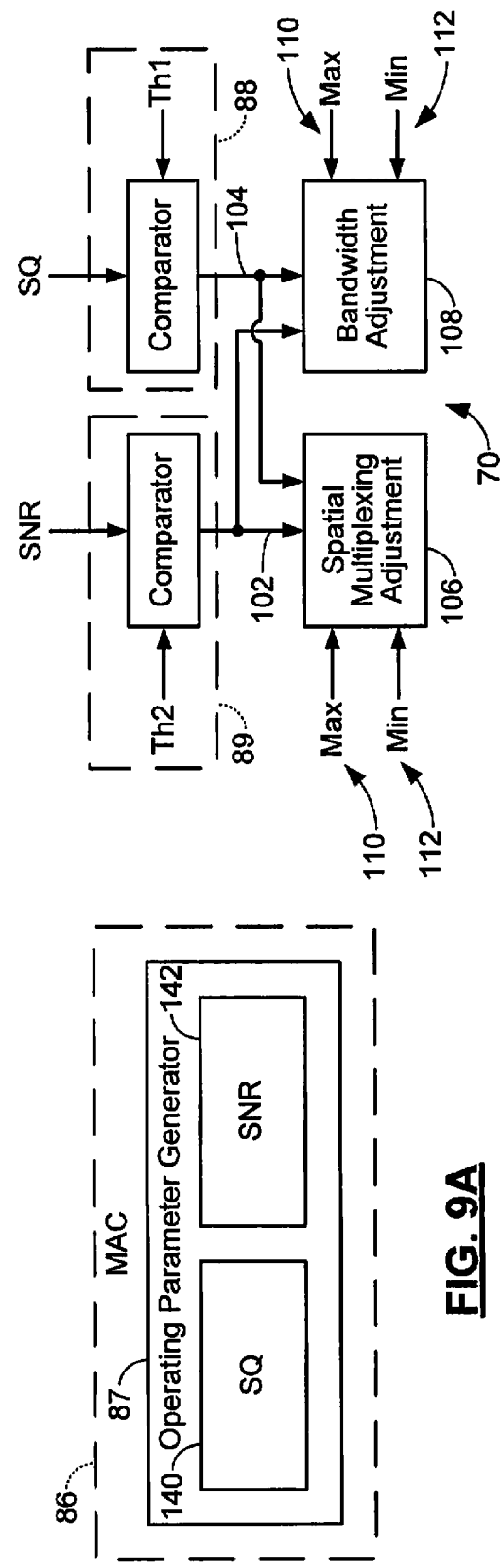
FIG. 9A illustrates a fourth exemplary operating parameter generator in a wireless communications device that includes a signal quality (SQ) generator and a signal-to-noise (SNR) generator.
FIG. 9B is a functional block diagram of a fourth exemplary link adaptation system that is based on an SQ and an SNR.

Referring now to FIGS. 9A and 9B, the operating parameter generator 87 of the remote wireless communications device 84 includes a signal quality (SQ) generator 140 and a signal-to-noise ratio (SNR) generator 142. Assuming that an SQ measurement provides an indication of a packet error rate or a bit error rate, the SQ generator 140 determines a quality of the signal at the remote wireless communications device 84. The SNR generator 142 determines whether the wireless channel is noisy. For example, a low SQ and a high SNR may indicate an LOS or "keyhole" effect environment when the amount of spatial multiplexing is high. The remote wireless communications device 84 sends the SQ and the SNR to the link adaptation module 70 of the wireless communications device 58.

Referring to the link adaptation module 70 in FIG. 9B, the signal correlation module 89 compares the SNR to a first threshold and generates the signal correlation control signal 102 based on the comparison. The transmission error module 88 compares the SQ to a second threshold and generates the transmission error control signal 104 based on the comparison. The spatial multiplexing adjustment module 106 and the bandwidth adjustment module 108 receive the transmission error control signal 104 and the signal correlation control signal 102. Those skilled in the art can appreciate that the link adaptation module may operate based on operating parameters or metrics of the wireless channel other than those illustrated in FIGS. 6A-9B.

Figure 10:
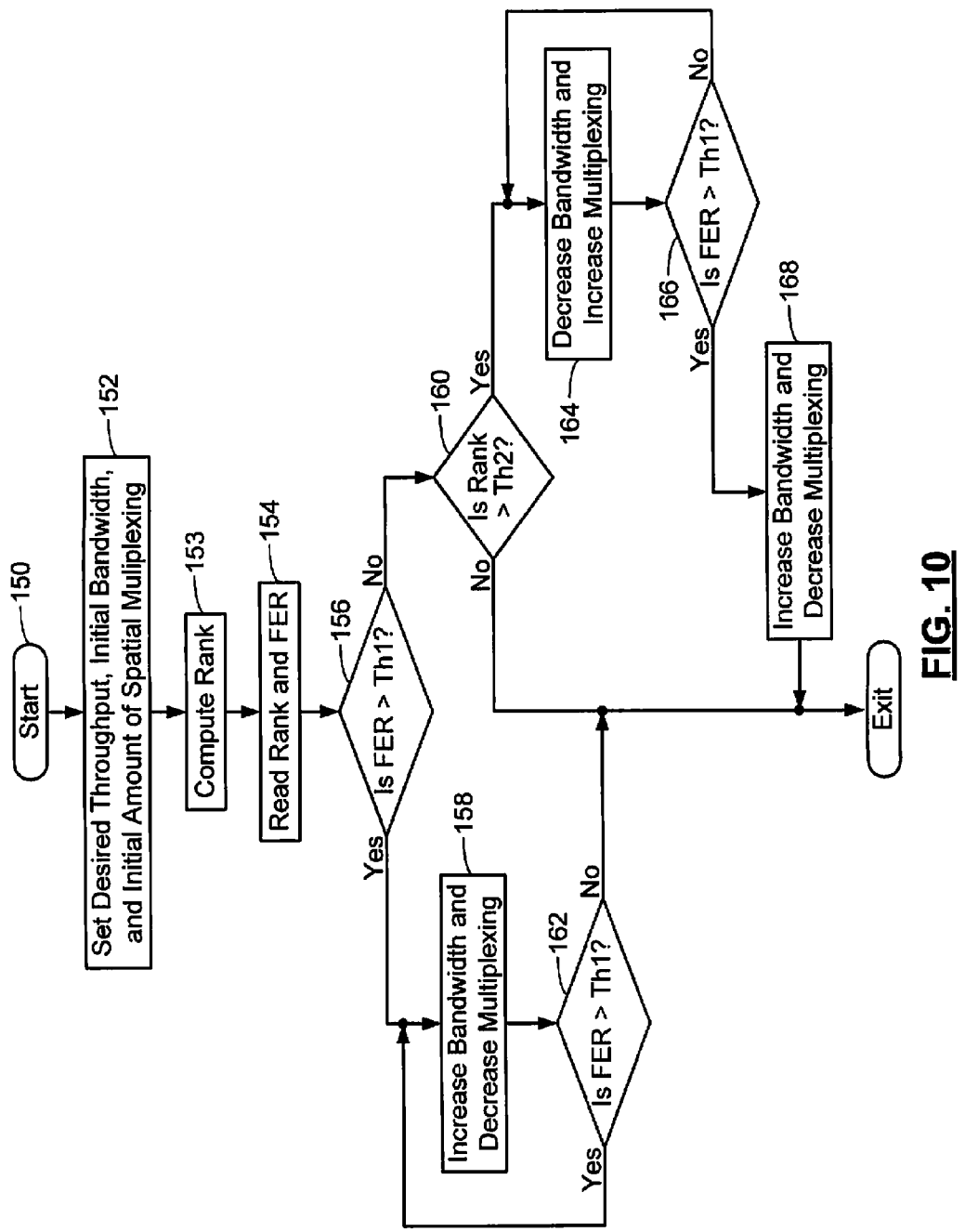
FIG. 10 is a first flowchart illustrating steps performed by the link adaptation module of FIG. 5.

Referring now to FIG. 10, a first exemplary link adaptation algorithm that is implemented by the link adaptation module 70 begins in step 150. In step 152, the link adaptation module 70 sets a desired throughput, an initial bandwidth, and an initial amount of spatial multiplexing. In step 153, the rank computation module 96 computes the rank. In step 154, the signal correlation module 89 reads the rank, and the transmission error module 88 reads the frame error rate (FER). In step 156, control determines whether the FER is greater than a first predetermined value. If true, control proceeds to step 158. If false, control proceeds to step 160.

In step 158, the link adaptation module 70 increases the bandwidth and decreases the amount of spatial multiplexing. In step 162, control determines whether the FER is greater than the first predetermined value. If false, control ends. If true, control returns to step 158. In step 160, control determines whether the rank is greater than a second predetermined value. If false, control ends. If true, control proceeds to step 164. In step 164, the link adaptation module 70 decreases the bandwidth and increases the amount of spatial multiplexing. In step 166, control determines whether the FER is greater than the first predetermined value. If false, control returns to step 164. If true, control proceeds to step 168. In step 168, the link adaptation module 70 increases the bandwidth and decreases the amount of spatial multiplexing and control ends. Alternatively, the link adaptation module 70 may select a different channel in step 158 instead of increasing the bandwidth in the event that only the current channel is operating defectively.

Figure 11:
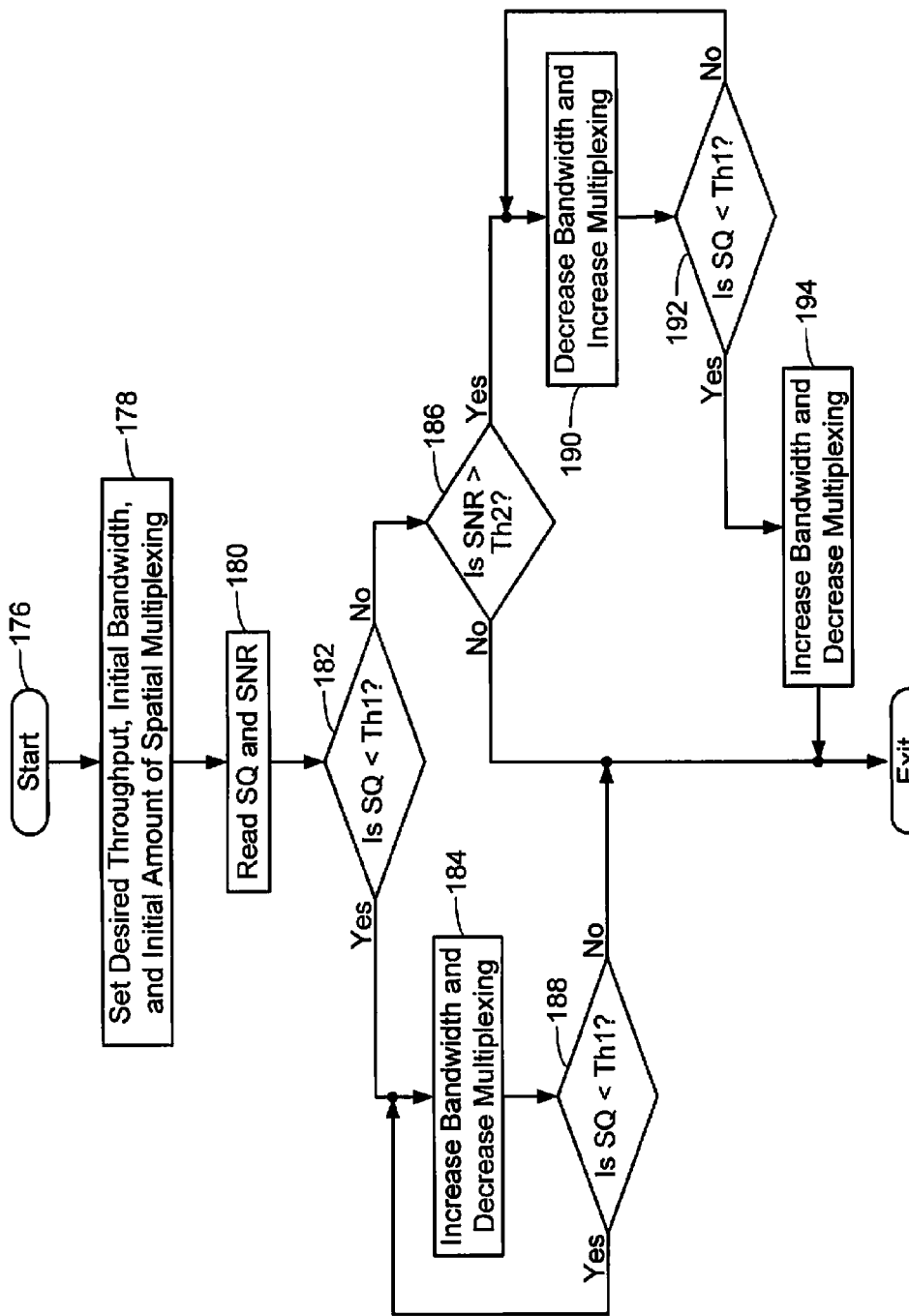
FIG. 11 is a second flowchart illustrating steps performed by the link adaptation module of FIG. 5.

Referring now to FIG. 11, a second exemplary link adaptation algorithm that is implemented by the link adaptation module 70 begins in step 176. In step 178, the link adaptation module 70 sets a desired throughput, an initial bandwidth, and an initial amount of spatial multiplexing. In step 180, the signal correlation module 89 reads the signal-to-noise ration (SNR) and the transmission error module 88 reads the signal quality (SQ) measurement. In step 182, control determines whether the SQ measurement is less than a first predetermined value. If true, control proceeds to step 184. If false, control proceeds to step 186.

In step 184, the link adaptation module 70 increases the bandwidth and decreases the amount of spatial multiplexing. In step 188, control determines whether the SQ measurement is less than the first predetermined value. If false, control ends. If true, control returns to step 184. In step 186, control determines whether the SNR is greater than a second predetermined value. If false, control ends. If true, control proceeds to step 190. In step 190, the link adaptation module 70 decreases the bandwidth and increases the amount of spatial multiplexing. In step 192, control determines whether the SQ is less than the first predetermined value. If false, control returns to step 190. If true, control proceeds to step 194. In step 194, the link adaptation module 70 increases the bandwidth and decreases the amount of spatial multiplexing and control ends. Alternatively, the link adaptation module 70 may select a different channel in step 184 instead of increasing the bandwidth in the event that only the current channel is operating defectively.

The first and second exemplary link adaptation algorithms of FIGS. 10 and 11 utilize rank as well as SQ and SNR, respectively, as the correlation measurement. However, other parameters such as angle of array (AOA) and/or a received signal strength indicator (RSSI) may be used to determine the correlation of signals in the wireless channel. Additionally, while FER and SQ were used in FIGS. 10 and 11, respectively, as a measure of transmission error rate, other parameters such as bit error rate (BER) and packet error rate (PER) may be used to indicate whether the desired bandwidth is being maintained. However, SQ typically increases as the transmission error rate decreases and FER/BER/PER typically decrease as transmission error rate decreases. Therefore, other measures of a transmission error rate may not be completely interchangeable with SQ in FIG. 11.

The wireless communications device 58 may receive a negative acknowledgement (NACK) to indicate an unsuccessfully transmitted symbol. Furthermore, there is a conceivable limit at which the link adaptation module 70 can no longer increase the bandwidth due to the wireless channel conditions. In this case the link adaptation module 70 may have to resort to increasing the transmit power as high as possible and accepting a throughput that is less than the desired throughput.

The link adaptation module 70 of the present invention utilizes correlation measurements of signals in the wireless channel at the remote wireless communications device 84 to adaptively choose a bandwidth that is sufficient to maintain a desired throughput. The transmission error module 88 indicates when the wireless communications device 58 is unable to maintain the desired throughput for a given bandwidth. The signal correlation module 89 determines when space-time processing techniques may be ineffective. The link adaptation module 70 preferably determines whether the desired throughput is being maintained continuously and adapts by adjusting the bandwidth after a predetermined number of failed packets. In a rich-scattering environment, space-time processing techniques are effective and less bandwidth may be utilized. As soon as space-time techniques are unable to support a desired throughput, the link adaptation module 70 increases the bandwidth and decreases the amount of spatial multiplexing.

The link adaptation module 70 may operate with or without feedback. For example, in many wireless channels a remote transceiver sends an acknowledgement packet following each packet that is sent by a transceiver. If operating parameters are unavailable from the remote wireless communications device 84, brute force exhaustive trials may also be used to determine a sufficient bandwidth to sustain a desired throughput. For example, the wireless communications device 58 may begin transmitting at a desired bit-rate. If the transmissions fail, the wireless communications device 58 can incrementally occupy more channels until a desired throughput is achieved. While the link adaptation algorithm of the present invention uses additional processing time, its benefits outweigh the added processing time when a specific throughput is critical to an application. Additionally, depending on a current application, the link adaptation module 70 may be temporarily disabled or only utilized at specified times while executing applications. For example, the level and extent of adaptation may be altered.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A wireless communications device for a multiple input multiple output (MIMO) wireless communications system, the wireless communication device comprising:
    a radio frequency (RF) transceiver including at least two antennae; and
    a medium access control (MAC) device to dynamically adjust a bandwidth of the wireless communications device by adjusting a number of channels associated with the at least two antennae,
    wherein the adjusting of the number of channels associated with the at least two antennae is based at least on a transmission error rate or a correlation measurement.

2. The wireless communications device of claim 1, wherein the medium access control (MAC) device:
    receives the transmission error rate from a remote wireless communications device; and
    generates a transmission error control signal based on the transmission error rate.

3. The wireless communications device of claim 2, wherein the medium access control (MAC) device:
    receives the correlation measurement from the remote wireless communication device; and
    generates a signal correlation control signal based on the correlation measurement.

4. The wireless communications device of claim 3, wherein the medium access control (MAC) device adjusts the bandwidth based on the transmission error control signal and the signal correlation control signal.

5. The wireless communications device of claim 1, wherein the transmission error rate comprises one or more of a frame error rate (FER), a bit error rate (BER), a packet error rate (PER), or a signal quality (SQ) measurement.

6. The wireless communications device of claim 1, wherein the correlation measurement comprises a rank of a channel matrix of the multiple input multiple output (MIMO) wireless communications system.

7. The wireless communications device of claim 1, wherein the correlation measurement comprises an angle of array (AOA) of a signal at a remote wireless communications device.

8. The wireless communications device of claim 1, wherein the correlation measurement comprises a received signal strength indicator (RSSI), the received signal strength indicator (RSSI) indicating a strength of a signal received by the wireless communications device.

9. The wireless communications device of claim 1, wherein the wireless communications device is compliant with one or more of IEEE 802.11, 802.11a, 802.11g, 802.11n, or 802.16.

10. A method of operating a wireless communications device, the wireless communication device including at least two antennae, the method comprising:
    dynamically adjusting a bandwidth of the wireless communications device by adjusting a number of channels associated with the at least two antennae,
    wherein the adjusting of the number of channels associated with the at least two antennae is based at least on a transmission error rate or a correlation measurement.

11. The method of claim 10, wherein:
    the transmission error rate is received from a remote wireless communications device; and
    the method further includes generating a transmission error control signal based on the transmission error rate.

12. The method of claim 11, wherein:
    the correlation measurement is received from the remote wireless communication device; and the method further includes generating a signal correlation control signal based on the correlation measurement.

13. The method of claim 12, wherein adjusting the bandwidth comprises adjusting the bandwidth based on the transmission error control signal and the signal correlation control signal.

14. The method of claim 10, wherein the transmission error rate comprises one or more of a frame error rate (FER), a bit error rate (BER), a packet error rate (PER), or a signal quality (SQ) measurement.

15. The method of claim 10, wherein the correlation measurement comprises a rank of a channel matrix.

16. The method of claim 10, wherein the correlation measurement comprises an angle of array (AOA) of a signal at a remote wireless communications device.

17. The method of claim 10, wherein the correlation measurement comprises a received signal strength indicator (RSSI), the received signal strength indicator (RSSI) indicating a strength of a signal received by the wireless communications device.

18. The method of claim 10, wherein the wireless communications device is compliant with one or more of IEEE 802.11, 802.11a, 802.11g, 802.11n, or 802.16.

\* \* \* \* \*